(12) United States Patent
Zhang

(10) Patent No.: US 8,578,768 B2
(45) Date of Patent: Nov. 12, 2013

(54) TIRE VALVE WITH ELECTRONIC BOX OF TIRE PRESSURE MONITORING SYSTEM FOR AUTOMOBILE

(75) Inventor: Jianer Zhang, Hangzhou (CN)

(73) Assignees: Hangzhou Hamaton Tyre Valves Co., Ltd., Hangzhou, Zhejiang Province (CN); Jianer Zhang, Hangzhou, Zhejiang Province (CN)

( * ) Notice: Subject to any disclaimer, the term of this patent is extended or adjusted under 35 U.S.C. 154(b) by 158 days.

(21) Appl. No.: 13/127,312

(22) PCT Filed: Sep. 17, 2009

(86) PCT No.: PCT/CN2009/073988
§ 371 (c)(1),
(2), (4) Date: May 3, 2011

(87) PCT Pub. No.: WO2010/054567
PCT Pub. Date: May 20, 2010

(65) Prior Publication Data
US 2011/0209538 A1 Sep. 1, 2011

(30) Foreign Application Priority Data

Nov. 17, 2008 (CN) .......................... 2008 1 0122300
Nov. 17, 2008 (CN) ..................... 2008 2 0167485 U

(51) Int. Cl.
*B60C 23/04* (2006.01)

(52) U.S. Cl.
CPC ......... *B60C 23/0408* (2013.01); *B60C 23/0494* (2013.01)
USPC ....................................... 73/146.8

(58) Field of Classification Search
USPC ................................. 73/146–146.8
See application file for complete search history.

(56) References Cited

U.S. PATENT DOCUMENTS

| | | | |
|---|---|---|---|
| 2003/0000297 A1* | 1/2003 | Ito et al. | 73/146 |
| 2006/0125612 A1* | 6/2006 | Okubo et al. | 340/445 |
| 2008/0083272 A1* | 4/2008 | Katou et al. | 73/146.8 |
| 2009/0007649 A1* | 1/2009 | Kempf et al. | 73/146.8 |
| 2010/0064792 A1* | 3/2010 | Chuang et al. | 73/146.8 |
| 2010/0192682 A1* | 8/2010 | Gory et al. | 73/146.8 |
| 2011/0209537 A1* | 9/2011 | Zhang | 73/146.8 |

* cited by examiner

*Primary Examiner* — Andre Allen
(74) *Attorney, Agent, or Firm* — Jacobson Holman PLLC; Jiwen Chen

(57) ABSTRACT

A tire valve with an electronic box 100 of tire pressure monitoring system for automobile comprises a valve metal body 1 and an elastic body 2 around the metal body 1. The metal body 1 comprises an air introducing and discharging hole 4. The metal body 1 has an external threaded stem 5 for connecting with the electronic box 100 of tire pressure monitoring system for automobile at the end. The air introducing and discharging hole 4 is set above the external threaded stem 5. The valve metal body 1 can be mounted on the electronic box 100 of tire pressure monitoring system for automobile through the external thread, therefore the connection strength between the electronic box 100 and the valve can be reinforced conveniently.

7 Claims, 5 Drawing Sheets

TIRE VALVE WITH ELECTRONIC BOX OF TIRE PRESSURE MONITORING SYSTEM FOR AUTOMOBILE

This is a U.S. national stage application of PCT Application No. PCT/CN/2009/073988 under 35 U.S.C. 371, filed Sep. 17, 2009 and published in Chinese, claiming the priority benefit of Chinese Application No. 200810122300.1, filed Nov. 17, 2008 and Chinese Application No. 200820167485.3, filed Nov. 17, 2008, which are hereby incorporated by reference.

FIELD OF THE INVENTION

The present invention relates to a tire valve for automobile.

BACKGROUND OF THE INVENTION

A tire valve for automobiles comprises a valve metal body with an elastic body around the metal body. The top thread of the metal body connects to a protective cap and a valve core is set inside the metal body. The valve is mounted on a rim with its end inside the tire. At the present, it is required for some automobiles to monitor the tire pressure when being driven. Consequently, an electronic box of a tire pressure monitoring system, mounted inside the tire, is connected to the valve for real-time examination. At present, a bolt hole is placed on the metal body of the valve, the metal body uses an internal thread to connect the electronic box of the tire pressure monitoring system. However, such connection structure is likely to become loose when tires are running at a high speed.

SUMMARY OF THE INVENTION

It is thus the object of the present invention to provide a tire valve to securely mount an electronic box of a tire pressure monitoring system. Therefore the invention adopts the following technical schemes: it comprises a valve metal body with an air introducing and discharging hole, and an elastic body around the valve metal body, wherein the metal body has an external threaded stem for connecting with the electronic box of the tire pressure monitoring system at the end part, with the electronic box of the tire pressure monitoring system mounted on the external threaded stem and the air introducing and discharging hole placed on the upside of the external threaded stem. By adopting the above technical schemes, the mental body using the external thread to achieve the installation of the electronic box of the tire pressure monitoring system facilitates different ways to reinforce the connection strength, for example, the way covering the external threaded stem with the connection structure of the electronic box and place the connection structure against the step or extended plane of the metal body and using multiple nuts and external threaded stem to lock the connection structure to make sure the electronic box of the tire pressure monitoring system and the valve are securely locked when the vehicle is running at a high speed.

DESCRIPTION OF THE PREFERRED EMBODIMENT

Figure 1:
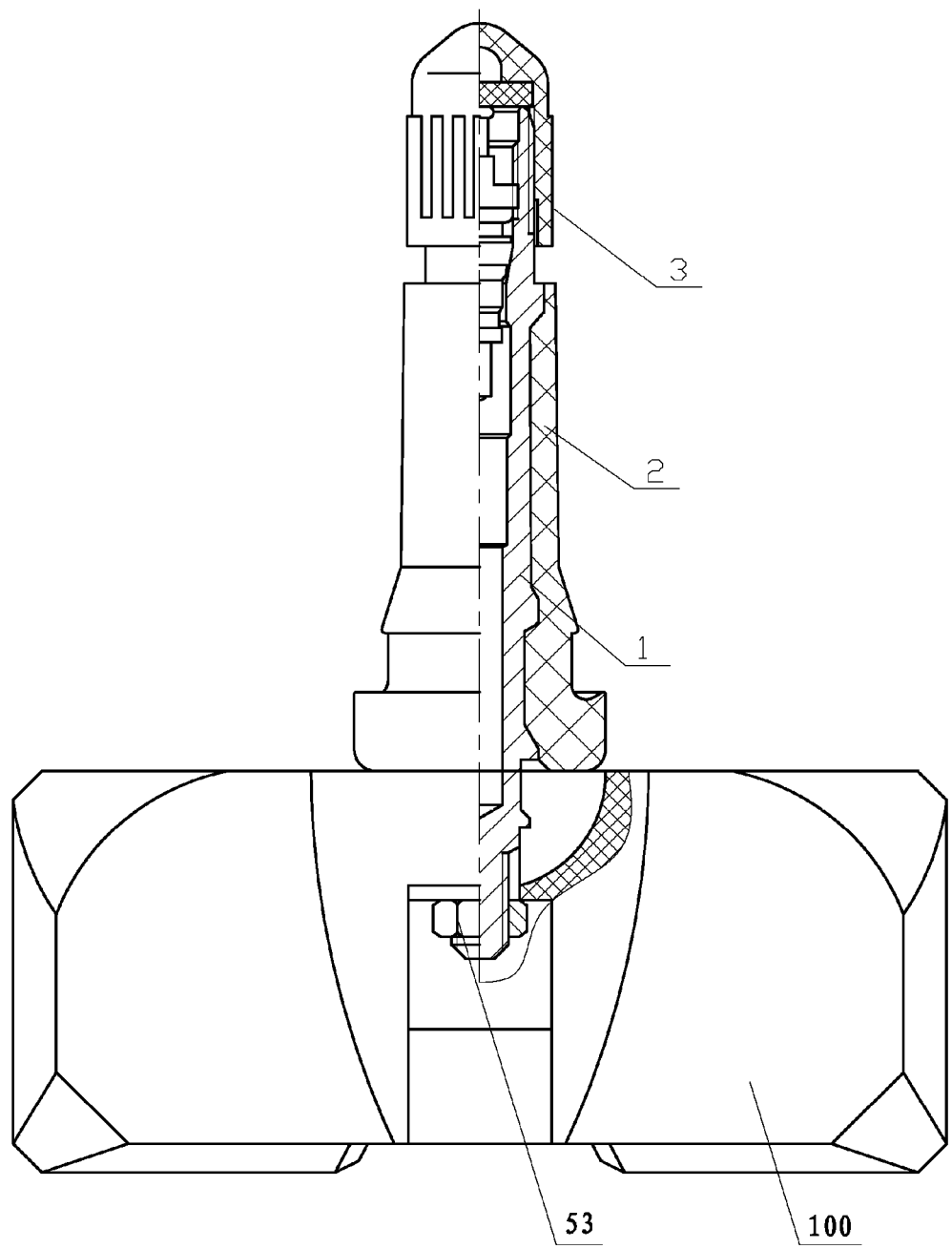
FIG. 1 shows the connection diagram between the provided embodiment and the electronic box of the tire pressure monitoring system.
Figure 3:
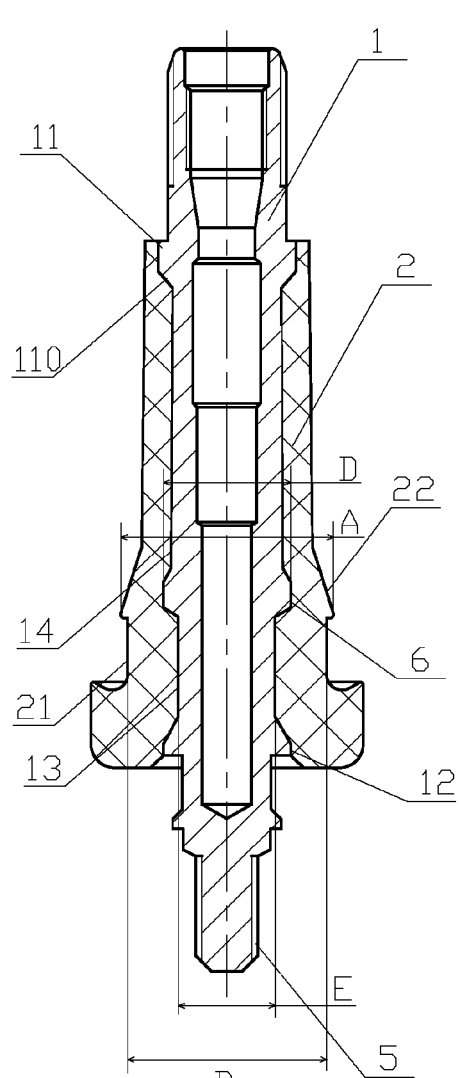
FIG. 3 shows the section diagram of the embodiment without the protective cap in FIG. 1.
Figure 2:
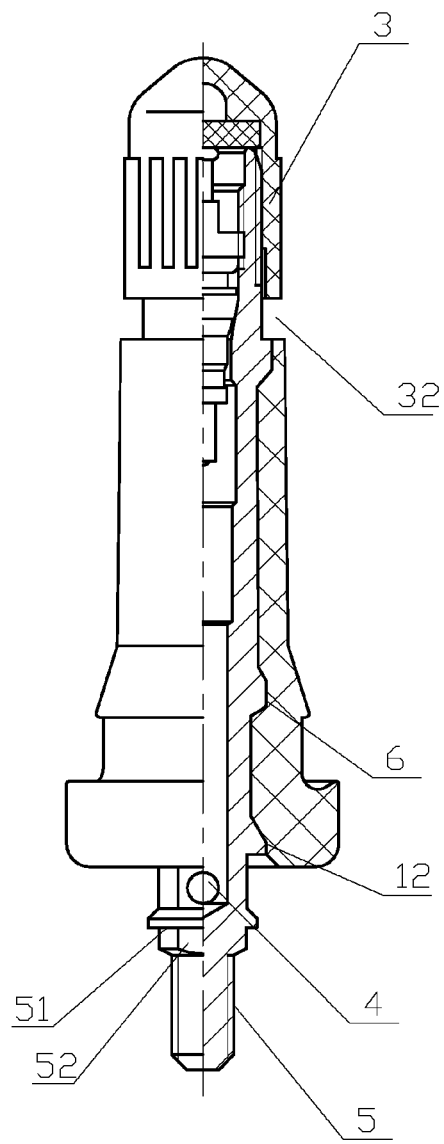
FIG. 2 shows the half section diagram of the embodiment in FIG. 1.
Figure 4:
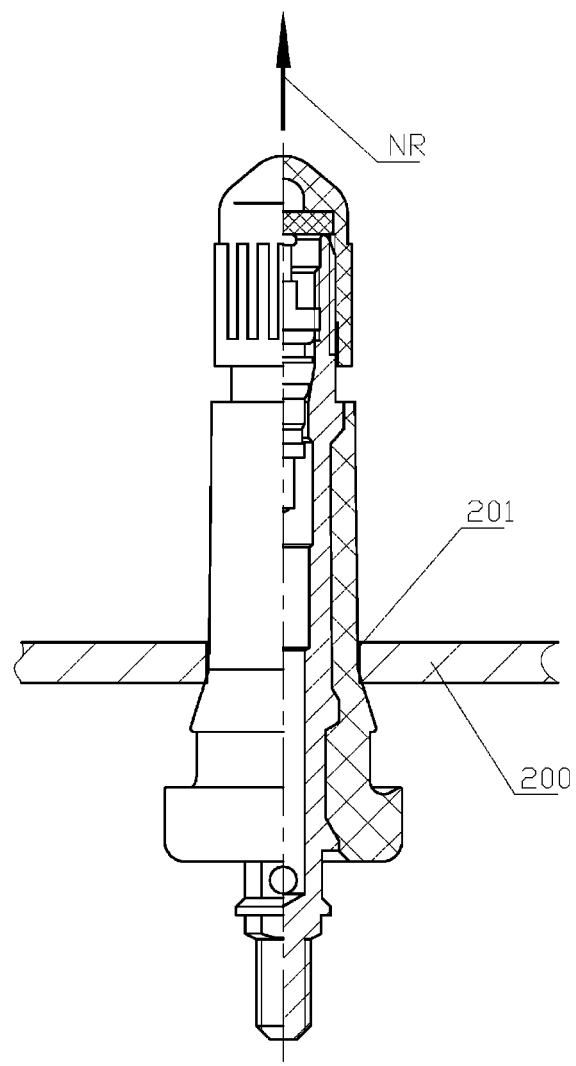
FIG. 4 shows the direction and state of the pull-in force. Label NR denotes the pull-in force direction.
Figure 5:
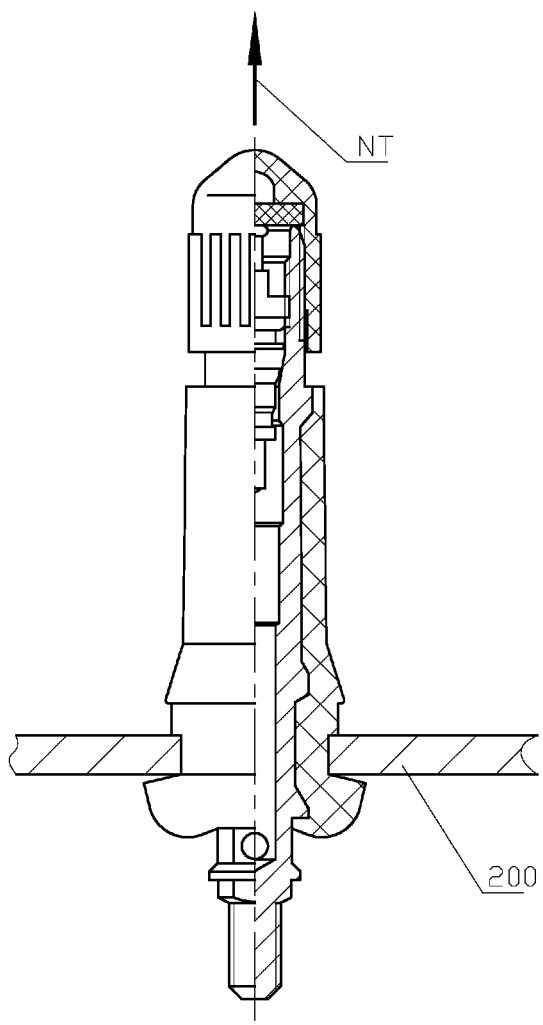
FIG. 5 shows the direction and state of the pull-out force. Label NT denotes the pull-out force direction.
Figure 6:
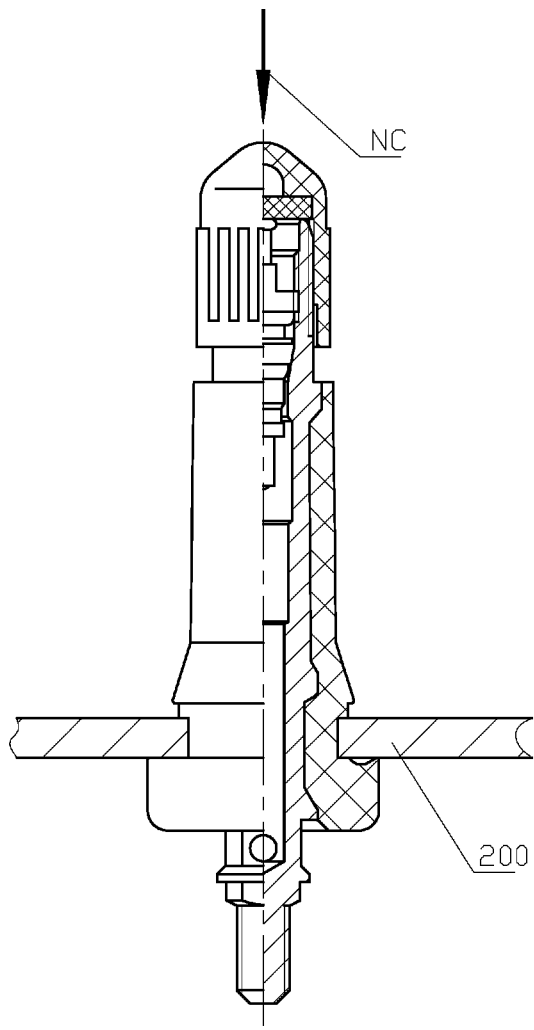
FIG. 6 shows the direction and state of the retreating force. Label NC denotes the retreating force direction.

Referring to the figures, the present invention comprises a valve metal body 1 and an elastic body 2 around the metal body 1. The elastic body 2 may use vulcanized rubber with hardness at 75 A. The metal body 1 has a first cylindrical portion 13 corresponding to a rim opening 201. The metal body 1 has an annular flange 6 to enlarge retreating force for the valve above the first cylindrical portion, and has a lower annular flange 12 corresponding to the lower end of the elastic body under the cylindrical portion. The elastic body 2 has a first cylindrical elastic portion 21 around the first cylindrical portion, and has a tapered portion 22 around the annular flange to enlarge retreating force. The lower end of the elastic body is placed around the lower annular flange. The lower annular flange 12 ensures not only the air tightness between the elastic body and the metal body but also rubber vulcanization positioning of the elastic body 2. The outer diameter E of the first cylindrical portion is 5.9~6.5 mm and the outer diameter D of the annular flange to enlarge retreating force is 8.6~9.2 mm; the difference between the outer diameter D of the annular flange to enlarge retreating force and the outer diameter E of the first cylindrical portion is over 2.7 mm. The maximum outer diameter A of the tapered portion of the elastic body 22 is 13.8~14.2 mm, and the outer diameter B of the first cylindrical elastic portion is 13~13.5 mm. The rim in the figure is numbered 200. The diameter of the rim opening 201 is 11.5±0.2 mm.

As shown in the figures, the upside and downside of the annular flange to enlarge retreating force 6 are bevel and the jump of the downside is larger than the upside. In other words, the difference between the maximum diameter of the annular flange to enlarge retreating force 6 and the diameter of the first cylindrical portion 13 is larger than the difference between the maximum diameter of the annular flange 6 and the diameter of the metal body cylindrical portion 14. This makes the valve easy to meet the requirements of both ejection force and pull-in force.

The metal body 1 has an air introducing and discharging hole 4. The metal body has an external threaded stem 5 used to connect the electronic box 100 of the tire pressure monitoring system at the end; the air introducing and discharging hole 4 is placed on the upside of the external screw thread stem. This invention uses the external screw thread to achieve the installation of the electronic box of the tire pressure monitoring system. Compared with internal thread, it facilitates different ways to reinforce the connection strength, for example, the way covering the external threaded stem with the connection structure of the electronic box and place the connection structure against the step or extended plane of the metal body and using multiple nuts and external threaded stem to lock the connection structure to make sure the electronic box of the tire pressure monitoring system and the valve are securely locked when the vehicle is running at a high speed. Label 53 denotes the securing nut matched with the external threaded stem 5.

The metal body has a limit step 51 for the electronic box between the external threaded stem and the air introducing and discharging hole. The metal body has an anti-rotation plane 52 between the electronic box limit step and the external threaded stem to further prevent the electronic box 100 from loosing.

A head thread of the metal body connects to a protective cap 3. A gap is left between the upper side of the elastic body and the protective cap to form a space 32 for inserting the tool which mounts the valve on the rim. Therefore during the installation, it is not necessary to use great effort to clip the valve, but only required to insert the tool between the upper side of the elastic body and the protective cap and pull up the valve to make it matching with the downside of the protective cap to be pulled, and mounted in the rim opening conveniently.

The metal body 1 of the valve has an upper annular step 11 corresponding to the upper side of the elastic body to facilitate rubber vulcanization positioning of the elastic body 2. The downside 110 of the lower annular step is a slope.

To meet the requirement of the retreating force and the pull-in/pull-out force is a pair of contradictory body. Connecting the end of the metal body with the electronic box 100 of the tire pressure monitoring system makes the contradictory change qualitatively. A large number of practices during the manufacture of this invention prove that it is difficult to solve above problem without setting the annular flange 6 to enlarge retreating force. However, even if the annular flange 6 is set, the diameter of the annular flange 6, the diameter of the elastic body around the annular flange 6, the diameter of the first cylindrical portion 13 and the diameter of the elastic body around the first cylindrical portion 13 still restraint each other, which makes the choice difficult. After a large quantity of experiments, it is concluded in this invention that within the scope of the following numerical value, the valve connecting with the electronic box 100 of the tire pressure monitoring system is able to obtain the ideal retreating force, pull-out force and pull-in force at the same time: the outer diameter E of the first cylindrical portion is 5.9~6.5 mm, the outer diameter D of the annual flange is 8.6~9.2 mm and the difference between the outer diameter D of the annular flange and the outer diameter E of the first cylindrical portion is 2.7 mm; the maximum outer diameter A of the tapered portion is 13.8~14.2 mm and the outer diameter B of the first cylindrical elastic portion is 13~13.5 mm and the rubber hardness of the elastic member is 75 A.

The table below shows part of the test data of 10 valves in a group:

| Groups | Outer diameter A (mm) | Outer diameter B (mm) | Outer diameter D (mm) | Outer diameter E (mm) | Average pull-in force (N) | Average pull-out force (N) | Average retreating force (N) |
| --- | --- | --- | --- | --- | --- | --- | --- |
| 1 | 13.7 | 12.9 | 8.5 | 5.8 | 296 | 578 | 850 |
| 2 | 13.8 | 12.7 | 8.2 | 5.7 | 299 | 522 | 791 |
| 3 | 13.6 | 13.0 | 8.3 | 5.6 | 287 | 537 | 818 |
| 4 | 13.8 | 13.0 | 8.6 | 5.9 | 352 | 615 | 920 |
| 5 | 14.2 | 13.5 | 9.2 | 5.9 | 378 | 754 | 998 |
| 6 | 13.9 | 13.1 | 9.1 | 6.0 | 360 | 635 | 940 |
| 7 | 14.0 | 13.2 | 9.0 | 6.1 | 370 | 687 | 955 |
| 8 | 14.1 | 13.3 | 8.9 | 6.2 | 363 | 722 | 961 |
| 9 | 14.0 | 13.4 | 9.0 | 6.3 | 368 | 783 | 943 |
| 10 | 13.9 | 13.2 | 9.0 | 6.4 | 358 | 711 | 901 |
| 11 | 13.8 | 13.5 | 9.2 | 6.5 | 348 | 830 | 920 |
| 12 | 14.2 | 13.5 | 9.2 | 6.5 | 381 | 839 | 1014 |
| 13 | 14.3 | 13.3 | 9.3 | 6.6 | 462 | 850 | 1020 |
| 14 | 13.7 | 12.9 | 9.3 | 6.7 | 445 | 770 | 870 |
| 15 | 14.2 | 13.0 | 9.3 | 6.5 | 453 | 750 | 980 |

In the table, the standard is met when the average pull-in force is smaller than 450N, average pull-out force is larger than 600N and average retreating force is larger than 900N.

The invention claimed is:

1. A tire valve mounted on an electronic box of a tire pressure monitoring system for automobile comprises a valve metal body with an air introducing and discharging hole, and an elastic body around the valve metal body, wherein the metal body has an external threaded stem for connecting with the electronic box of the tire pressure monitoring system at the end, with the electronic box of the tire pressure monitoring system mounted on the external threaded stem and the air introducing and discharging hole placed on the upside of the external threaded stem, wherein said metal body has a first cylindrical portion corresponding to a rim opening, an annular flange to enlarge retreating force for the valve above the first cylindrical portion, and an lower annular flange corresponding to the lower end of the elastic body under the cylindrical portion; and said elastic body has a first cylindrical elastic portion around the first cylindrical portion, a tapered portion around the annular flange to enlarge retreating force, with the lower end of the elastic body placed around the lower annular flange; and the outer diameter of the first cylindrical portion is 5.9~6.5 mm and the one of the annular flange to enlarge retreating force is 8.6~9.2 mm with the difference between the outer diameter of annular flange and the first cylindrical portion over 2.7 mm; and the maximum outer diameter of the tapered portion of the elastic body is 13.8~14.2 mm and the outer diameter of the first cylindrical elastic portion is 13~13.5 mm.

2. The tire valve mounted on an electronic box of a tire pressure monitoring system for automobile according to claim 1, wherein said metal body has a limit step for the electronic box of the tire pressure monitoring system between the external threaded stem and the air introducing and discharging hole.

3. The tire valve mounted on an electronic box of a tire pressure monitoring system for automobile according to claim 2, wherein said metal body has an anti-rotation plane between the electronic box limit step and the external threaded stem.

4. The tire valve mounted on an electronic box of a tire pressure monitoring system for automobile according to claim 1, wherein said metal body has an annular step corresponding to the lower side of the elastic body on the upside and close to the introducing and discharging hole, which is around the annular step on the outside.

5. The tire valve mounted on an electronic box of a tire pressure monitoring system for automobile according to claim 1, wherein the head thread of the metal body connects to a protective cap and a gap is left between the upper side of the said elastic body and the protective cap to form a space for inserting the tool which mounts the valve on the rim.

6. The tire valve mounted on an electronic box of a tire pressure monitoring system for automobile according to claim 5, wherein said metal body of the valve has an annular step corresponding to the upper of the elastic body.

7. The tire valve mounted on an electronic box of a tire pressure monitoring system for automobile according to claim 6, wherein the backside of said annular step is a slope.

* * * * *